June 25, 1929. J. B. LACY 1,718,566
STEREOTYPING APPARATUS
Filed Sept. 27, 1928 2 Sheets-Sheet 1
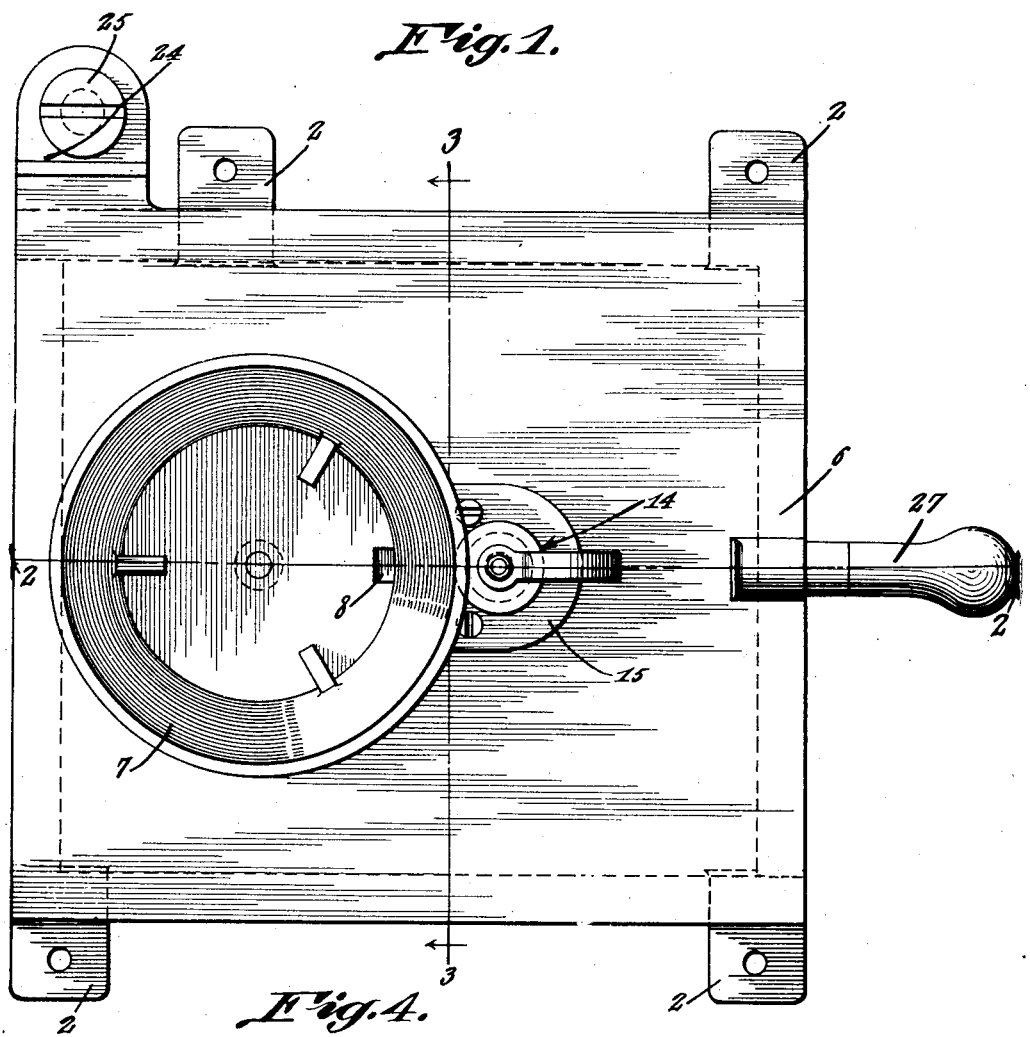
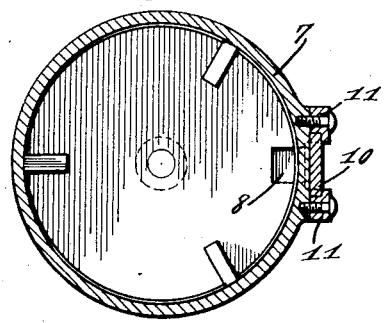
J. B. Lacy, Inventor
By C. A. Snow & Co.
Attorneys.

June 25, 1929.  J. B. LACY  1,718,566
STEREOTYPING APPARATUS
Filed Sept. 27, 1928   2 Sheets-Sheet 2
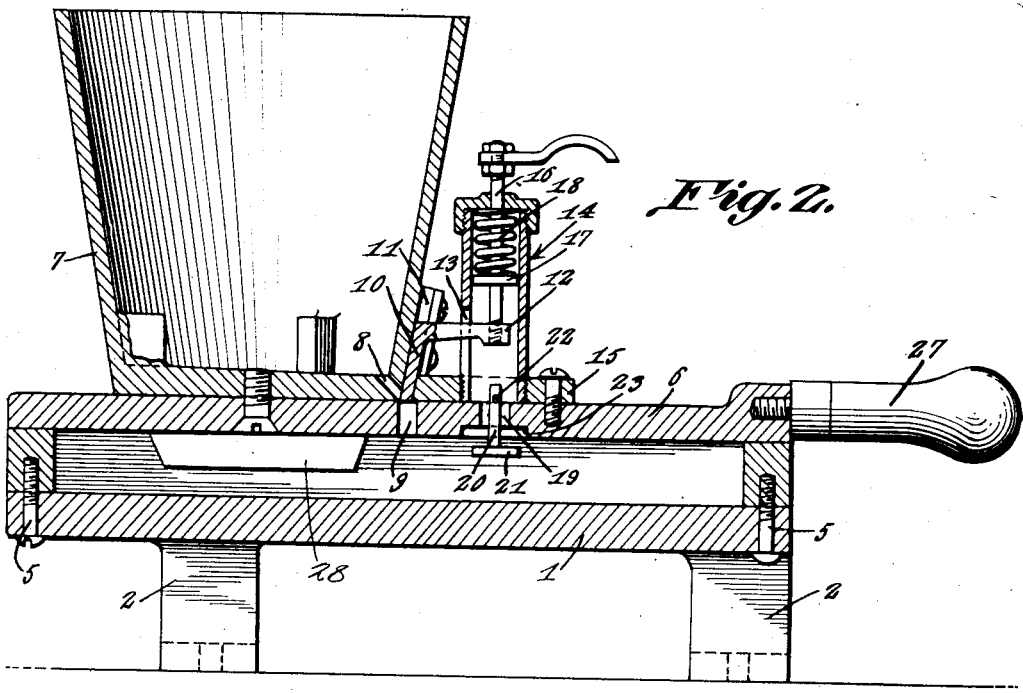
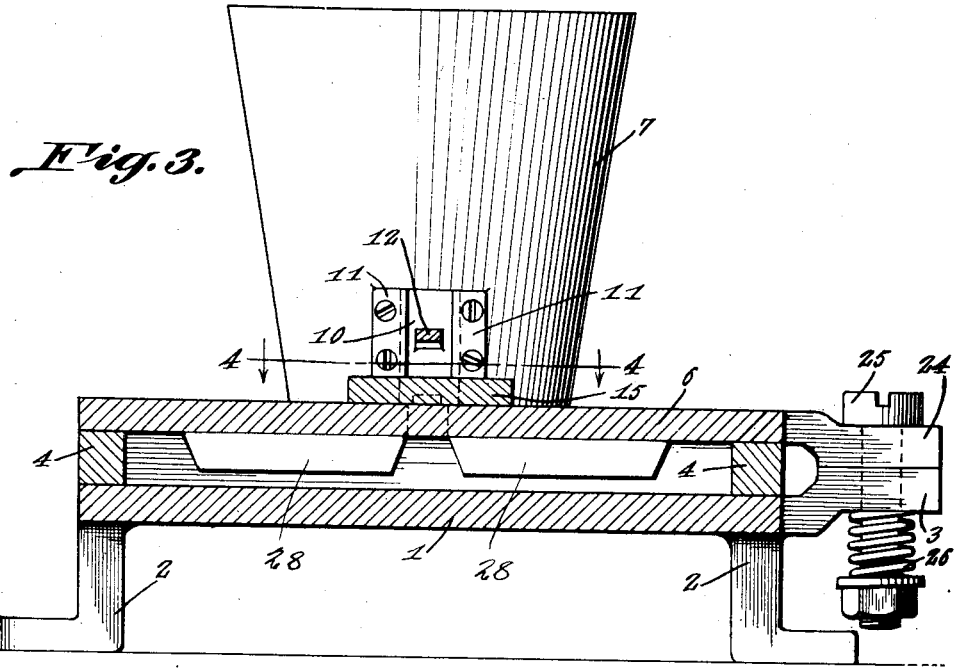
J. B. Lacy, Inventor Patented June 25, 1929.

1,718,566

UNITED STATES PATENT OFFICE.

JOHN B. LACY, OF ROCKY FORD, COLORADO.

STEREOTYPING APPARATUS.

Application filed September 27, 1928. Serial No. 308,858.

This invention relates to stereotyping apparatus, one of the objects being to provide a simple, compact and inexpensive apparatus in which stereotypes can be cast readily upon a matrix, it being unnecessary thereafter to employ means for trimming the cast plate.

A further object is to provide an apparatus which can be easily handled and will enable proprietors of small printing plants to use matrices without employing expensive equipment heretofore found necessary.

With the foregoing and other objects in view which will appear as the description proceeds the invention resides in the combination and arrangement of parts and in the details of construction hereinafter described and claimed it being understood that changes in the precise embodiment of the invention herein disclosed may be made within the scope of what is claimed without departing from the spirit of the invention.

In the accompanying drawings the preferred form of the invention has been shown.

In said drawings,

Figure 1 is a top plan view of the apparatus.

Figure 2 is a section on line 2—2, Figure 1.

Figure 3 is a section on line 3—3, Figure 1.

Figure 4 is a section through the melting pot taken on line 4—4, Figure 3.

Referring to the figures by characters of reference, 1 designates the base of the apparatus having suitable supports 2 whereby it is held off of the bench or other structure on which it is mounted, there being an upwardly offset ear 3 extending from one edge of the base adjacent to one corner. Mounted on the base adjacent the edges thereof are opposed L-shape spacing strips 4 adapted to abut at their ends, these strips being held in position by any suitable means, such as screws 5 and being of a height equal to the thickness of the plate to be cast. Obviously by using spacing strips of different widths the space defined thereby can be varied to correspond with the area of the matrix used in the apparatus. If preferred, however, the L-shaped spacing strips, which are in lapped relation at their ends, might be shifted relative to each other to vary the size of the defined space.

The top plate of the apparatus has been indicated at 6 and supports a melting pot 7 which can be heated electrically or in any other way, it being unnecessary to illustrate the heating means. An outlet opening 8 is formed in the bottom of the pot and is adapted to communicate with another opening 9 in the top plate 6. Opening 8 is normally closed by a slidable gate 10 mounted in guides 11 and having an arm 12 which extends through a slot 13 formed in a tubular housing 14. This housing has a base plate 15 secured to the top plate 6 and extending up to the gate 10.

A rod 16 is secured to arm 12 and is slidable in the top of housing 14. This rod has a collar 17 secured to it which constitutes a thrust bearing for a coiled spring 18 mounted on the rod 16 and bearing against the upper end of housing 14. By thrusting against collar 17 the spring serves to hold the gate 10 normally closed.

The lower end of housing 14 communicates with an opening 19 in the top plate 6. In this opening is supported the stem 20 of a check valve 21, there being a cross pin 22 in the stem adapted to bridge the opening 19 and limit the downward movement of the valve. A recess 23 is formed in the top plate 6 to receive the valve when closed.

An ear 24 is extended from one corner of the top plate 6 and laps and contacts with the ear 3. Both ears are engaged by a pivot bolt 25 on which is mounted a coiled spring 26 which presses yieldingly against one of the ears thereby to hold the top plate against free movement. A handle 27 extends from the top plate.

In practice a matrix not shown is placed on the base 1 and the top plate 6 is then swung laterally to close the space within the apparatus. Casting metal is heated in the pot 7 and thereafter, by pulling upwardly on handle 16 the gate 10 will be opened and metal will flow through the openings 8 and 9 into the mold. The displaced air will escape through the opening 19 until the rising molten metal causes the valve 21 to close. At that time the gate is closed. The top plate 6 can then be swung laterally by means of handle 27 about pivot 25, thereby exposing the cast plate which can be removed with the matrix and set up in a press.

The plate produced in this way requires no finishing operation such as sawing or trimming and will come out the correct size and ready for the form.

In large apparatus filling blocks 28 can be used for the purpose of saving metal, it being understood that these blocks will produce recesses in the stereotype. The blocks can be magnetized so as to adhere to the plate 6 at any point where they may be placed thereon.

What is claimed is:

1. Apparatus of the class described including a base, a top plate mounted to swing horizontally relative thereto, spacing elements between the base and top plate defining a space in which a matrix is adapted to fit snugly on the base, a melting pot opening into said space, a normally closed gate for said outlet, means for opening the gate, and a valved air vent in the top plate.

2. Apparatus of the class described including a base, a top plate mounted to swing horizontally relative thereto, spacing means on the base, there being a matrix receiving space defined by the spacing means, and a melting pot carried by the top plate and having a valved outlet opening into said space.

3. Apparatus of the class described including a base, a top plate mounted to swing horizontally relative thereto, spacing means on the base, there being a matrix receiving space defined by the spacing means, a melting pot carried by the top plate and having a valved outlet opening into said space, the top plate being provided with an air vent, and a check valve for said air vent adapted to be closed by molten metal rising within the matrix receiving space.

4. Apparatus of the class described including a base, a top plate mounted to swing horizontally relative thereto, spacing elements between the base and top plate defining a space in which a matrix is adapted to fit on the base, a melting pot carried by the top plate and adapted to swing therewith, said melting pot opening into the space between the plates, and a valve for controlling communication between the melting pot and said space.

In testimony that I claim the foregoing as my own, I have hereto affixed my signature.

JOHN B. LACY.